United States Patent [19]

Van Lang et al.

[11] 4,423,192
[45] Dec. 27, 1983

[54] LUBRICATED THERMOPLASTIC COMPOSITIONS OF POLYVINYLIDENE FLUORIDE

[75] Inventors: Huynh Van Lang, Lyons; Jean-Paul Ollivier, Paris, both of France

[73] Assignee: PCUK Produits Chimiques Ugine Kuhlmann, Courbevoie, France

[21] Appl. No.: 388,948

[22] Filed: Jun. 16, 1982

Related U.S. Application Data

[63] Continuation of Ser. No. 173,879, Jul. 31, 1980, abandoned, and Ser. No. 916,279, Jun. 16, 1978, abandoned.

[30] Foreign Application Priority Data

Jun. 24, 1977 [FR] France .............................. 77 19382

[51] Int. Cl.$^3$ ............................................. C08L 27/18
[52] U.S. Cl. ................................ 525/199; 264/176 R; 264/331.14; 524/520; 526/255
[58] Field of Search .................. 525/199; 264/331.14, 264/176 R; 524/520; 526/255

[56] References Cited

U.S. PATENT DOCUMENTS

| | | | |
|---|---|---|---|
| 2,820,772 | 1/1958 | Barnhart | 525/199 |
| 3,531,432 | 9/1970 | Graver | 525/199 |
| 3,765,932 | 10/1973 | Kokubo et al. | 525/199 |
| 3,798,287 | 3/1974 | Murayama et al. | 525/199 |
| 3,962,373 | 6/1976 | Petrucelli | 525/199 |
| 4,094,949 | 6/1978 | Yokokawa et al. | 525/199 |

OTHER PUBLICATIONS

Ca. 84 61,427a (1976).
Ca. 76 154,663z (1972).

*Primary Examiner*—Veronica P. Hoke
*Attorney, Agent, or Firm*—Pennie & Edmonds

[57] ABSTRACT

A process for lubricating polyvinylidene fluoride consisting of introducing into a polyvinylidene fluoride base resin from 0.1 to 10% by weight of low molecular weight polytetrafluoroethylene, in the preferred embodiment.

3 Claims, No Drawings

LUBRICATED THERMOPLASTIC COMPOSITIONS OF POLYVINYLIDENE FLUORIDE

This is a continuation of application Ser. No. 173,879, now abandoned, filed July 31, 1980, and Ser. No. 916,279 filed June 16, 1978 now abandoned.

FIELD OF THE INVENTION

The invention relates to fluoro polymer compositions.

BACKGROUND OF THE INVENTION

Vinylidene fluoride homopolymers are thermoplastic resins noted for their mechanical, thermal, electrical and chemical properties. They differ from other prior art fluoro polymers by having a greater capacity for production using conventional techniques for transformation of thermoplastics.

However, such capacity for production is relative. Actually, only polyvinylidene fluorides of slight or medium molecular weight are moldable or extrudable. On the other hand, those with high or very high molecular weights, because of high viscosity in the molten state do not have capacity for production by conventional techniques.

On the other hand, production becomes difficult, if not impossible when fillers are to be incorporated into the structure of the polyvinylidene fluorides. Sometimes it is necessary to add filler either to cut cost or improve particular properties such as dimensional stability and thermal resistance. Depending on the nature, amount or form of the fillers added, the rheological characteristics of the resulting mixtures are modified and most often make production difficult.

Prior art fillers, that tend to improve the rheological characteristics of vinylidene fluoride homopolymers, have been described in French patent Nos. 2,069030 and 2,019,492. French patent No. '030 discloses the use of low or high density polyethylene in a homogeneous mixture with polyvinylidene fluorides. These types of polyolefin actually contribute a notable lubricating effect but have very limited compatibility with a base resin, reflected by the opaque tint of its mixtures, and its slight thermal stability, leading to a rapid degradation, limit use of these polyolefin types. French patent No. '492 teaches the incorporation of high molecular weight polytetrafluoroethylene in the form of fine particles. However, the presence of this latter polymer, while making possible the elimination of extrusion defects known as "melt fracture" and "die fracture", causes an increase in the viscosity of the polyvinylidene fluoride in the molten state. This increased viscosity, corresponding to a reduction in fluidity at high temperatures, is particularly undesirable in most of the conventional processing techniques.

The essential principles of injection of expanded thermoplastics are described by Clarence W. Wallace in *Plastics Engineering* of November, 1976. In particular, the author stresses the necessity of a high-speed injection to obtain a maximum expansion and a good surface appearance. However, high-speed injection produces undesirable heating at the passage in the injection nozzle and leads to thermal degradation of the polymer. Thus, expanded formulations require lubrication to avoid this phenomenon.

The works of H. Ebneth et al in *Kunstoff Rundschau*, No. 5 (May, 1971), show the importance of fluidity in the molten state during filling of a mold with expanded thermoplastic. The ratio between the maximum travel of the material, from the point of injection to the part most distance from this point and the thickness of the product are essential characteristics linked to ease of molding. The higher this ratio the more fluid the material should be. Expanded formulations should therefore be as fluid as possible to permit filling of large molds.

SUMMARY OF THE INVENTION

The invention relates to compositions made up of 90 to 99.9% by weight of polyvinylidene fluoride as a base resin, and 0.1 to 10% by weight of polytetrafluoroethylene of low molecular weight as a modifying or filler resin. These compositions, in which the presence in the dispersed state of a modifying resin does not affect the fundamental properties of the base resin, are characterized by excellent flow properties, making easier the processing of the compositions by conventional injection, extrusion and calendering techniques. The compositions of the present invention are particularly useful in the production of expanded thermoplastics by injection molding.

DETAILED DESCRIPTION OF THE PREFERRED EMBODIMENTS

Applicants have developed a process to improve production of polyvinylidene fluoride products by mixing that polymer thoroughly with low molecular weight polytetrafluoroethylene. The amounts of polytetrafluoroethylene to be incorporated can vary between about 0.1% and about 30% by weight, but preferably from about 0.1% to about 0.8% in high and very high molecular weight polyvinylidene fluorides, and from about 0.5% to about 10% in low and medium molecular weight resins. Contrary to the high molecular weight polytetrafluoroethylene, the low molecular weight polytetrafluoroethylene reduces the viscosity in the molten state, thereby improving the moldability of the mixtures obtained. Contrary to low or high density polyethylene, the low molecular weight polytetrafluoroethylene maintains an excellent thermal stability for mixtures of the present invention. Further, the original mechanical and chemical properties of the polyvinylidene fluoride are not altered.

Use of low molecular weight polytetrafluoroethylene as a filling agent in polyvinylidene fluoride based compositions results in the following advantages:

(I) Improvement in the production of medium molecular weight polyvinylidene fluoride products having complicated geometries and designs;

(II) Improvements in molding high and very high molecular weight polyvinylidene fluorides by conventional techniques to make products having superior mechanical properties;

(III) Increase in the fluidity of compositions containing fillers at elevated temperatures;

(IV) Improvement in the appearance of products produced by the process of the present invention; and (V) Production of expanded thermoplastic products having an excellent appearance.

The expression "polyvinylidene fluoride" as used in the present application applies not only to vinylidene fluoride homopolymers obtained by different prior art synthesis methods, which are available under various trademarks, but also to copolymers containing at least 90 mole percent of vinylidene fluoride groups. The molecular weights of the polyvinylidene fluorides used in the present invention are designated by melt indices (F), which are the weights in milligrams of the polymer extruded through a nozzle, 2 millimeters in diameter, of a capillary rheometer, for one minute under a mass of 10 kg, and at a temperature of 250° C. Thus, for example, a polymer having a melt index of F. 4000 has a low molecular weight, another of F. 1000 has a medium molecular weight, ideal for injection molding, and still another of F. 50 has a high molecular weight which is difficult to inject, but has high mechanical properties.

The expression "low molecular weight polytetrafluoroethylene" designates a tetrafluoroethylene homopolymer and in particular "SOREFLON L. 206", a trademark of Produits Chimiques Ugine Kuhlmann. That particular homopolymer is described as type III, according to ASTM.D.1457.75, and is obtained by polymerization in a dispersion, coagulation, drying, and degradation treatment by γ rays under 12 MRad. It has an actual density of 2.27 equal to a molecular weight of approximately 800,000, a first melting point of 330° C., and a viscosity in the melted state (380° C.) of approximately $10^6$ poises. This expression also designates other tetrafluoroethylene homopolymers of low molecular weight, for example Vydax of du Pont de Nemours and low molecular weight copolymers containing at least 90 mole percent of tetrafluoroethylene groups.

EXAMPLES

The following examples illustrate the invention without, however, limiting it. The polyvinylidene fluorides used in most of these examples, made by the polymerization in emulsion process, are called FORAFLON, a trademark of Produits Chimiques Ugine Kuhlmann.

EXAMPLES I AND II

Polyvinylidene fluorides prepared in emulsion and having fluidity indices of F.50, F.1000 and F.4000 are used. These polymers, modified or not by low molecular weight polytetrafluoroethylene, SOREFLON L.206, are in the form of powders that are extruded at 250° C. and transformed into granules. These granules are used to injection mold samples for measuring impact resistance Izod (ASTM D 256.75) and for measuring bending temperature under load (ASTM D.648.75). The granules are also used to determine the flow characteristics of these polymers by means of the Brabender plastograph, under the following conditions: roll mil of 30 g for rigid materials, temperature 250° C., speed 80 T/min.

Starting with the first two polymers mentioned above, FORAFLON F.50 and F.1000, two mixtures each comprising 0.5% by weight of SOREFLON L. 206 were prepared as follows. Powders of the components were mixed and homogenized in a rotary mixer in the shape of a "V" or "Y" or a cube. Those homogenized mixtures were then granulated. The characteristics of those modified polymers were determined in the manner designated above, and are tabulated below:

TABLE I

| Compositions Tested | Resisting Torque* | Impact Resistance** | Bending Temperature*** |
|---|---|---|---|
| Foraflon F.50: 100% | 1,750 | 323 | 117–139 |
| Foraflon F.50: 99.5% | | | |
| Soreflon L.206: 0.5% | 1,150 | 355 | 125–128 |
| Foraflon F.1000: 100% | 1,250 | 130 | 127–130 |
| Foraflon F.1000: 99.5% | | | |

TABLE I-continued

| Compositions Tested | Resisting Torque* | Impact Resistance** | Bending Temperature*** |
|---|---|---|---|
| Soreflon L.206: 0.5% | 990 | 135 | 125–128 |
| Foraflon F.4000: 100% | 680 | 80 | |

*(obtained on Brabender plastograph in m.g)
**(Izod in joule/m of notch)
***(under load (°C.) after annealing 1h 30min at 150° C.)

EXAMPLES III TO VII

Starting wth FORAFLON F.50, there were prepared mixtures comprising respectively 0.2, 0.3, 0.5, 0.7 and 0.9% by weight of SOREFLON F. 206. The mode of operation is the same as that described in Example I. The values of the resisting torque found on the Brabender plastograph, under the same conditions noted above, are given in the following table:

TABLE II

| Compositions Tested (FORAFLON F.50/SOREFLON L.206) | Resisting Torque (m.g) |
|---|---|
| 100/0.0 | 1,750 |
| 99.8/0.2 | 1,440 |
| 99.7/0.3 | 1,230 |
| 99.5/0.5 | 1,150 |
| 99.3/0.7 | 1,250 |
| 99.1/0.9 | 1,190 |

EXAMPLES VIII TO XI

Using the process described in Example I, there were prepared in varying proportions ternary mixtures comprising: polyvinylidene fluoride, a filler represented either by talc or by barium sulfate, and modifying resin SOREFLON L.206. The following results were measured on the Brabender plastograph:

TABLE III

| Compositions Tested (FORAFLON F.50/talc/SOREFLON L.206) | Resisting Torque (m.g) obtained on Brabender plastograph |
|---|---|
| 85/15/0 | 1,860 |
| 85/15/0.5 | 1,350 |
| 90/10/0.5 | 1,450 |
| 80/20/0.5 | 1,800 |

TABLE IV

| Compositions Tested (FORAFLON F.300/SO4Ba/SOREFLON L.206) | Resisting Torque (m.g) obtained on Brabender plastograph |
|---|---|
| 70/30/0 | 1,550 |
| 70/30/0.5 | 1,320 |

These results show that by use of a lubricant of the SOREFLON L.206 type, it is possible to filled high molecular weight polymers to obtain economically molded products that exhibit good mechanical properties. Thus, the mixture 85/15—FORAFLON F.50/talc, lubricated with 0.5% SOREFLON L.206, exhibits an impact resistance Izod of 175 j/m and an HDT of 140° C., as contrasted with 130 j/m and 127°–130° C. for pure FORAFLON F.1000.

EXAMPLE XII

Using the method described in Example I, two mixtures were prepared with FORAFLON F.1000 comprising respectively: 2% by weight of SOREFLON 7, which is a high molecular weight polytetrafluoroethylene of Type IV according to ASTM D.1457-75, and 2% by weight of SOREFLON L.206. Compared with control FORAFLON F.1000, these two mixtures have the following rheological characteristics:

TABLE V

| Composition Tested | Viscosity (in the molten state obtained on the Brabender plastograph (m.g)) | Apparent Viscosity (obtained on the capillary extrusion rheometer Instron with shearing speed of 120 sec$^{-1}$, at 250° C. (Pa.s)) |
|---|---|---|
| Pure FORAFLON F.1000 control | 1,250 | 1,500 |
| FORAFLON F.1000 modified with 2% SOREFLON 7 | 1,450 | 1,560 |
| FORAFLON F.1000 modified with 2% SOREFLON L.206 | 1,050 | 1,400 |

EXAMPLE XIII

Starting with FORAFLON F.1000 and following the same mode of operation as above, three mixtures are prepared comprising respectively 0.5% by weight of low density polyethylene Plastylene PX 144, a trademark of Ethylene Plastiques Company, 0.5% by weight of Vydax of du Pont de Nemours, and 0.5% of SOREFLON L.206. The following rheological characteristics were measured:

TABLE VI

| Composition Tested | Resisting Torque (m.g) |
|---|---|
| Pure FORAFLON F.1000 control | 1,250 |
| FORAFLON F.1000 + 0.5% Vydax | 1,180 |
| FORAFLON F.1000 + 0.5% Plastylene PX 144 | 1,060 |
| FORAFLON F.1000 + 0.5% SOREFLON L.206 | 990 |

The mixture comprising polyethylene had a deep brown color after staying 30 minutes in the roll mixture at 250° C., whereas the other mixtures remained perfectly clear.

EXAMPLE XIV

A composition made up of 99.5% FORAFLON F.4000 and 0.5% SOREFLON L.206 is subjected to extrusion-blowing. The resulting thin films are perfectly smooth and regular, whereas films from unmodified FORAFLON F.4000 have defects called "fish eyes". The same observation was made in an application to electrical sheathing by extrusion.

EXAMPLE XV

Granules were made of the master mixture with 90% by weight of FORAFLON F.1000 powder and 10% SOREFLON L.206. With these granules, Solef X 10 N, polyvinylidene fluoride, produced by the Solvay Company, was modified. A comparison of the rehological properties of a control with those of the compositions of this example appears below:

TABLE VII

| Composition Tested | | Resisting Torque (m.g) |
|---|---|---|
| Solef X 10 N pure | | 1,150 |
| Solef X 10 N | 95.5 | 1,020 |
| FORAFLON F.1000 | 4.5 | |
| Solef X 10 N | 95 | 920 |
| FORAFLON F.1000 | 4.5 | |
| SOREFLON L.206 | 0.5 | |

Identical tests made with KYNAR 200 of Pennwalt Chemical Company and DYFLOR 2020 of Dynamit Nobel gave similar results.

EXAMPLE XVI

A polyvinylidene fluoride as prepared in an emulsion and had a viscosity index of 4000. That polymer was injected into a spiral mold 90 cm long and 0.3 cm thick.

That operation was repeated by adding, on the one hand, 1% by weight of low density polyethylene and, on the other hand, 1% by weight of SOREFLON L.206. The path traveled by the material in the mold shows the ease in filling a mold.

The unmodified polyvinylidene fluoride gave 53 cm, while 58 cm were obtained for the two last mixtures.

EXAMPLE XVII

Starting with FORAFLON F.4000, three mixtures were prepared containing respectively 1% by weight of LUVOPOR AZ 6600 (mixture of azodicarbonamide and zinc oxide), a trademark of Lehmann and Voss; 1% of LUVOPOR AZ 6600 and 1% of low density polyethylene; 1% LUVOPOR AZ 6600 and 1% SOREFLON L.206. These three mixtures were separately injected in a mold having the shape of a parallelepiped box with a volume of 330 cm$^3$ and a thickness of 8 mm. The injection speed is 500 cm$^3$/second and the temperature profile shown is, from behind the screw forward: 160°–180°–240°–230° C. The three mixtures make it possible to obtain products having a specific mass about 1 lg/cm$^3$.

However, the first mixture (LUVOPOR AZ 6600) after 15 successive injections, resulted in products showing black lines indicating degradation of that polymer. The second mixture injected correctly, but resulted in products with scales on the surface, indicating poor compatibility of the polyethylene. The third mixture was very stable thermally, because no trace of degradation was observed after 70 successive injections. Further, the drawbacks of the second disappeared.

We claim:

1. A process for molding polyinylidene fluoride compositions using a lubricated polyinylidene consisting esstentially of:
   (a) blending said polyvinylidene fluoride composition with from about 0.1 W% to about 10 W% low molecular weight polytetrafluoroethylene wherein from about 0.1 W% to about 0.8 W% low molecular weight polytetrafluoroethylene is used to lubricate high molecular weight polyvinylidene fluoride compositions and from about 0.5 W% to about 10 W% low molecular weight polytetrafluoroethylene is used to lubricate medium and low molecular weight polyvinylidene fluoride compositions, said polytetrafluoroethylene having a molecular weight of about 800,000 or less and being sufficiently low in molecular weight to reduce the viscosity of said polyvinylidene fluoride in its molten state, said polytetrafluorothylene having at least 90 mole percent tetrafluoroethylene groups, and said polyvinylidene fluoride having at least 90 mole percent vinylidenefluoride groups and having a melt index when measured at 250° C. of: (1) from about 50 to 1000 when it is a high molecular weight polymer, (2) from about 1000 to 4000 when it is a medium molecular polymer and (3) over 4000 when it is a low molecular weight polymer; and (b) molding said lubricated polyvinylidene fluoride composition.

2. The process according to claim 1 wherein the lubricated polyvinylidene composition is extruded or injection molded.

3. A thermoplastic product produced according to the process of claim 1.

* * * * *

UNITED STATES PATENT AND TRADEMARK OFFICE
CERTIFICATE OF CORRECTION

PATENT NO. : 4,423,192
DATED : December 27, 1983
INVENTOR(S) : Huynh Van Lang and Jean-Paul Ollivier It is certified that error appears in the above—identified patent and that said Letters Patent is hereby corrected as shown below:

Column 2, line 6, reads "distance", should read --distant--.

Column 4, line 61, reads "possible to filled", should read --possible to resort to filled--.

Column 6, line 18, reads "as prepared", should read --was prepared--.

Signed and Sealed this

Fifth Day of June 1984

[SEAL]

Attest:

GERALD J. MOSSINGHOFF

Attesting Officer        Commissioner of Patents and Trademarks